INVENTOR.
RALPH E. KIKENDALL

United States Patent Office 3,487,852
Patented Jan. 6, 1970

3,487,852
RELIEF VALVE
Ralph E. Kikendall, Rosemead, Calif., assignor to Snap-Tite, Inc., a corporation of Pennsylvania
Filed Mar. 28, 1967, Ser. No. 626,468
Int. Cl. F16k *21/10, 21/04*
U.S. Cl. 137—514.5                               6 Claims

ABSTRACT OF THE DISCLOSURE

A relief valve which comprises a housing with a fluid inlet on the upstream side of a valve seat and a fluid outlet on the downstream side of a valve seat. A poppet is provided which has one end portion which extends into a control chamber and a second end which communicates with the inlet side of the valve. A fluid passage provides for fluid communication from the inlet of the valve to the control chamber and disposed in this fluid passageway is a manually movable by pass valve which can be opened to provide for fluid communication through the passageway or closed to prevent fluid communication through the passageway. This by pass valve is capable of being opened or closed by an operator from the outside of the housing. A check valve is also disposed in the passageway means and is for the purpose of slowing fluid flow from the control chamber back to the fluid inlet as distinguished from completely stopping fluid flow. The control chamber includes a spring member which is engageable with the first end portion of the valve to exert a mechanical force thereon tending to keep the valve closed and this mechanical force can be varied between limits by means of mechanism which extends exteriorly of the housing and which includes a control knob or handle connected to a rotatable shaft which by means of a retainer is in engagement with the spring member.

---

The present invention relates to relief valves back pressure regulators, and other types of valves and has the particular advantage of providing an extreme range of adjustments without the necessity of physically changing springs or other mechanisms and also is capable of handling high flow requirements. The relief valve which is disclosed herein is particularly adapted to the handling of gases. The structure of the present disclosure has the ability of being adjusted to handle the relief of pressures over a wide range and adjustments can be made to the valve externally thereof without the necessity of disassembling the same or removing it from the piping to which it is connected in a particular system. The presently disclosed relief valve is provided with a construction which enables the valve to close fluid flow therethrough with a very slight dropping of the pressure on the inlet side of the valve. In other words, the present valve is capable of relatively precise operation over a very narrow range of opening and closing pressures.

Figures 1, 2:
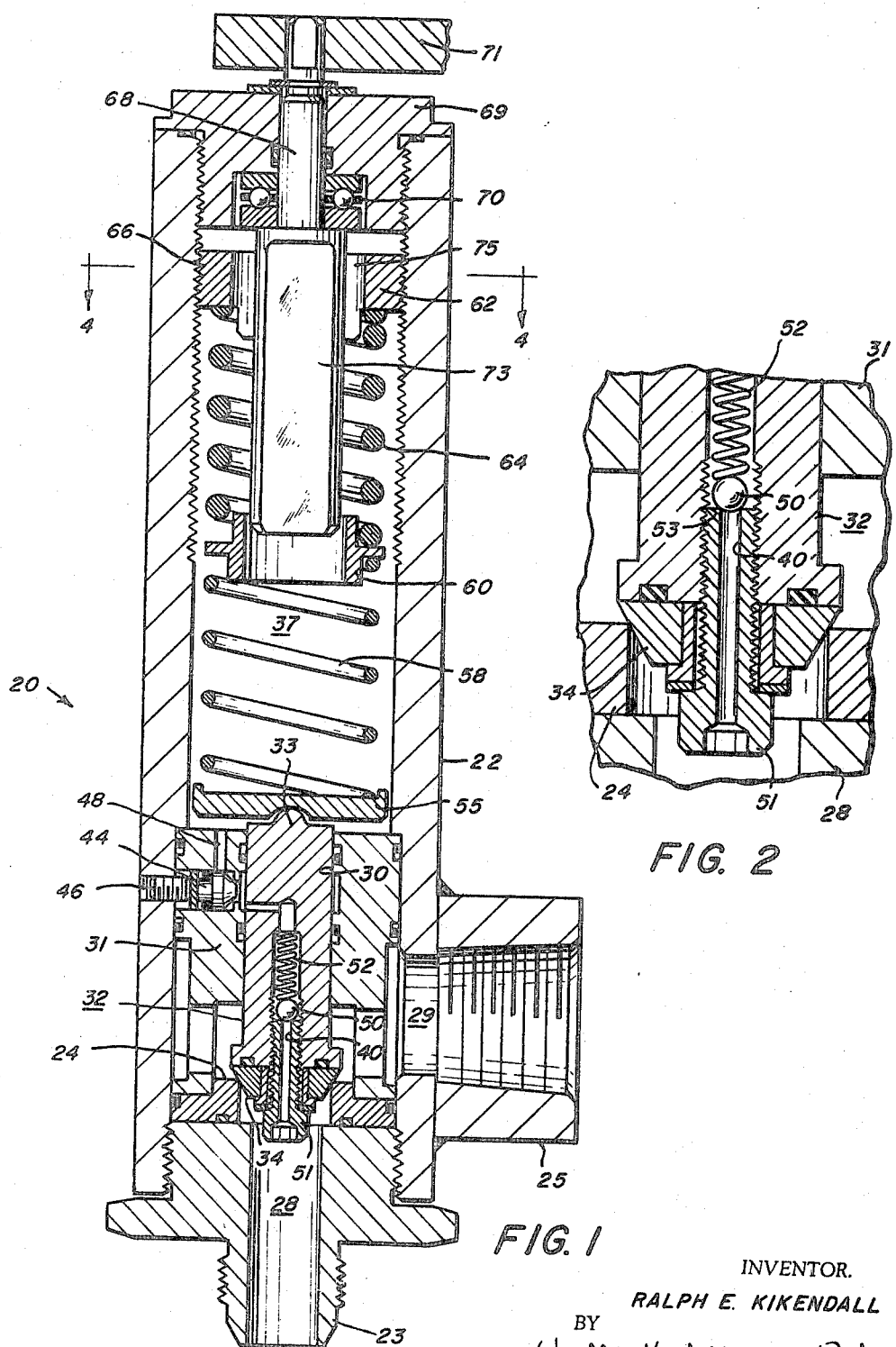
Figure 4:
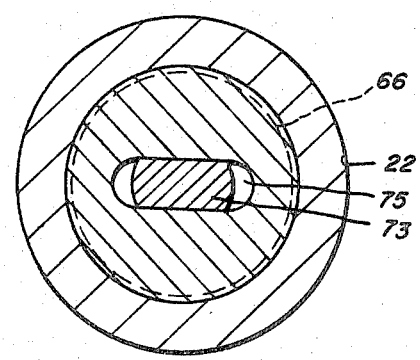
Figure 3:
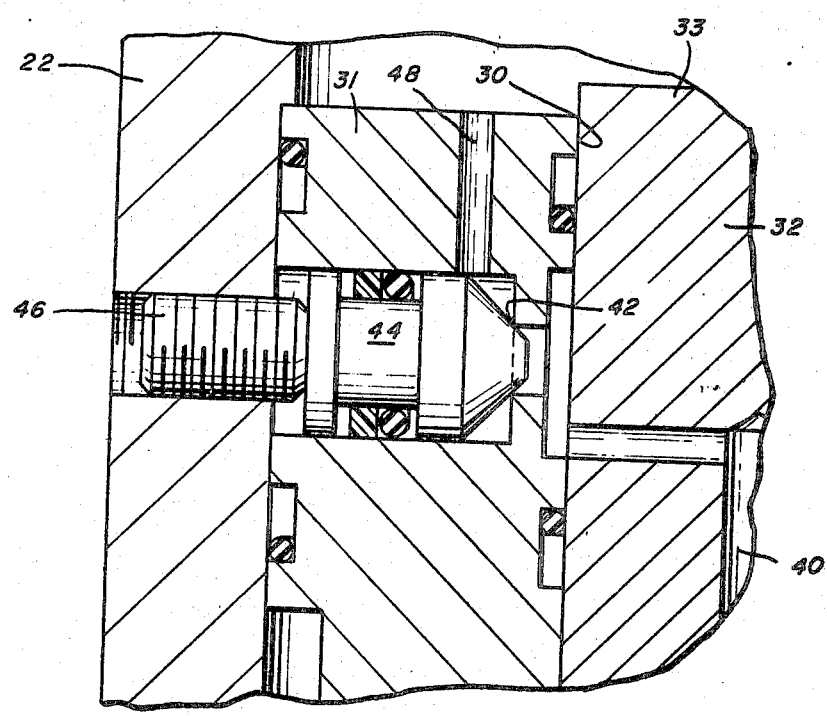
Figure 5:
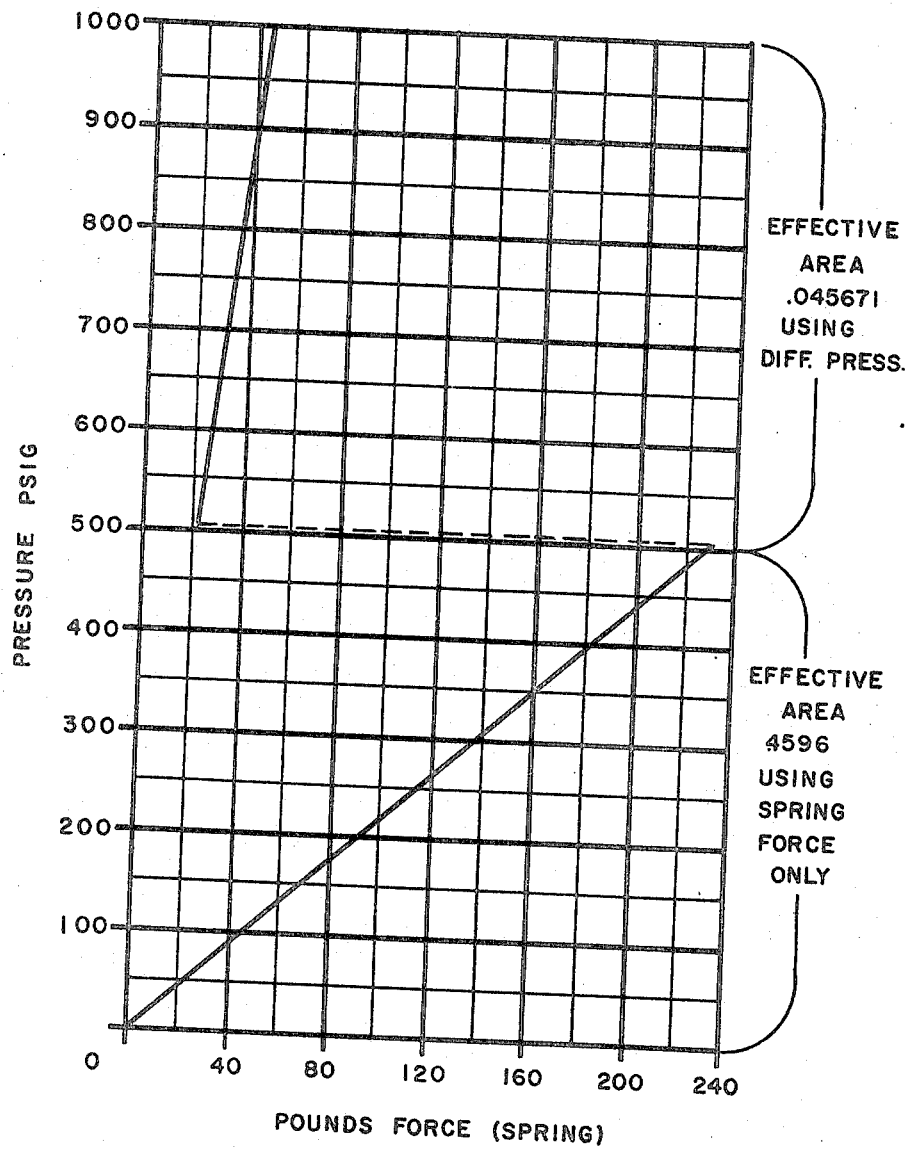
Figure 6:
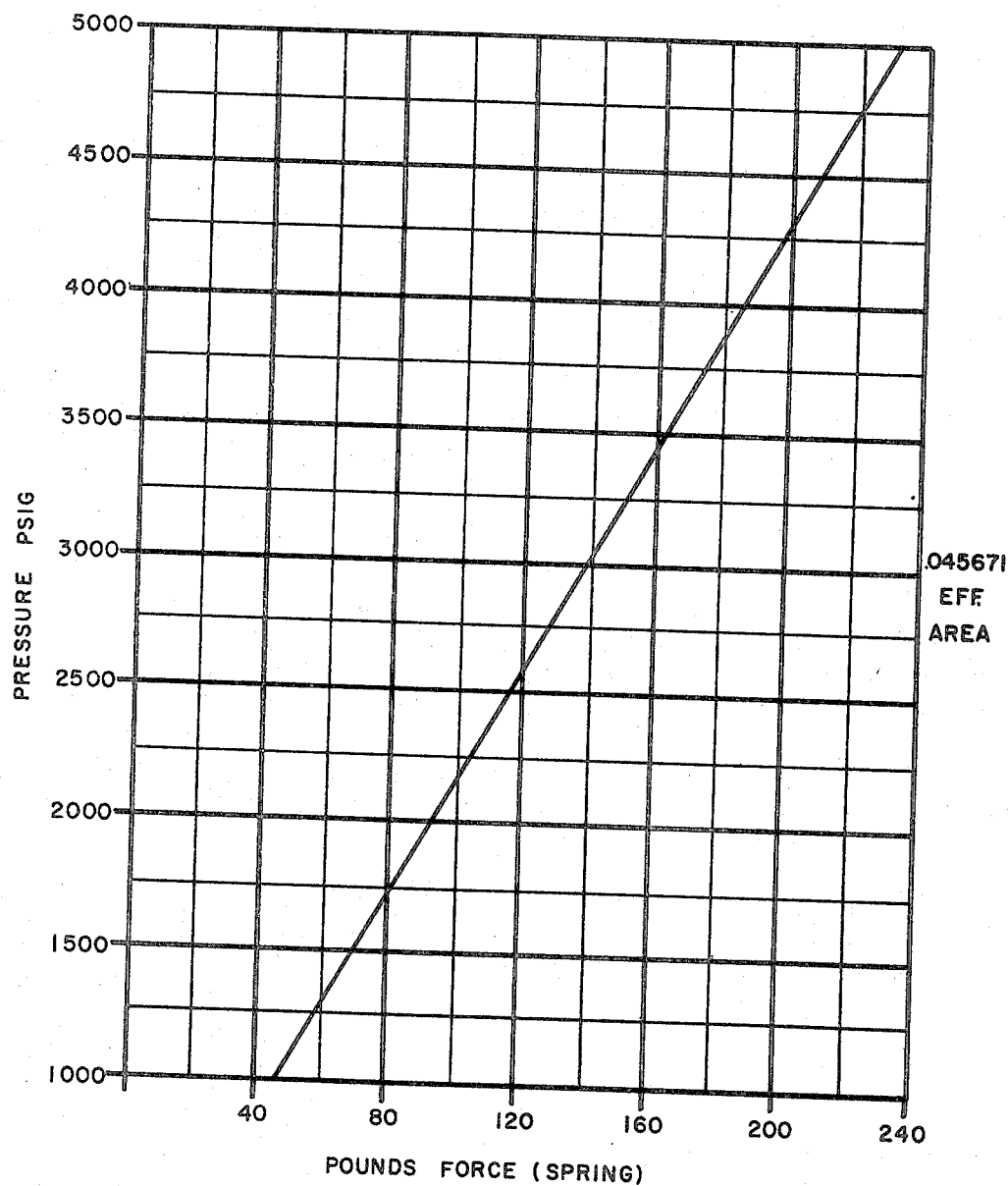

FIGURE 1 is a view in section showing the valve of the present invention;
FIGURE 2 is an enlarged view of a portion of the valve shown in FIGURE 1;
FIGURE 3 is an enlarged view of another portion of the valve shown in FIGURE 1;
FIGURE 4 is a view taken generally along the line 4—4 of FIGURE 1; and
FIGURES 5 and 6 are graphs showing the characteristics of one embodiment of the valve of the present invention.

Referring specifically to FIGURES 1 through 4, the relief valve has been indicated generally by the reference numeral 20 and comprises a housing 22 which includes in general a fitting 23 which defines a fluid inlet 28 which is secured to the housing 22 as shown. A body 25 is secured to the housing (or may be an integral part of the housing) and serves to define a fluid outlet 29. The fluid inlet 28 is on the upstream side of the valve and the fluid outlet 29 is on the downstream side of the valve. A valve seat 24 is located within the housing and serves as the dividing line between the upstream and dowstream sides of the valve.

A poppet 32 is provided and is capable of moving between open and closed positions (FIGURE 1) and is guided in this movement by being located in an opening 30 in a guide 31 which forms a part of the housing 22. The poppet is provided with a first end portion 33 which extends into a generally cylindrically shaped control chamber 37, formed by the housing. The second end portion 34 of the poppet 32 is located at the fluid inlet and is exposed to fluid pressure in the inlet 28.

A passageway 40 is provided, which extends axially into the popet 32 from the fluid inlet 28, as shown and then extends laterally to the outer surface of the poppet 32. A control valve seat 42 is provided in member 31 where the passageway 40 exits poppet 32. A manually operated by pass valve 44 is adapted to move between open and closed positions relative to seat 42. The by pass valve 44 is adapted to be moved by means of a set screw 46 which can be turned by an operator with a suitable tool from a position exterior of the housing. The by pass valve 44 as shown in FIGURE 1 is in closed position and in order to have the same move to open position the set screw is simply backed off and fluid pressure from the inlet 28 causes the by pass valve to open. A continuation passageway 48 provides communication from the by pass valve 44 to the control chamber 37. A check valve 50 is provided in passageway 40 and includes a seat which is formed by member 51 which is threadably secured in position as shown. A spring 52 serves to bias the check valve 50 to closed position. The check valve 50 has been referred to herein as an imperfect valve in the sense that it will not completely prohibit fluid flow from the control chamber 37 to the fluid inlet 28 when poppet 44 is open, but retards such flow. The imperfect condition of the check valve can be accomplished in several ways, one being an imperfect seat and this has been illustrated in the enlarged view of FIGURE 2 by means of a groove 53.

Referring now to the control chamber 37, it will be seen that a first spring retainer 55 is provided which engages the first end portion 33 of poppet 32 and a first spring 58 engages this retainer 55 at one end and engages an adapter 60 at its other end. A second spring retainer 62 is located opposite the first spring retainer 55 and a second spring 64 engages retainer 62 at one end and the adapter 60 at its other end. It will be seen from FIGURE 1 that the first spring 58 is of a lower spring rate than the second spring 64 and the purpose of this arrangement is to have the first spring (lower spring rate) function in the lower set pressure range, and the second spring take over in the next set pressure range.

The second spring retainer 62 is provided with threads 66 on the circumference thereof and these threads mesh with internal threads provided in the housing 22 and it will therefore be apparent that rotation of the retainer 62 in one direction will cause it to move downwardly in the housing compressing the springs 58 and 64 and rotation in the other direction will cause upward movement of the retainer with subsequent release of the compression on the springs. Rotation of the retainer 62 is accomplished by means of a shaft 68 which extends through an end cap 69 which is threadably secured to the housing as shown and the shaft is rotatably supported by bearings 70. A control knob or handle 71 is secured to the end of the shaft which extends exteriorly of the housing and a flattened portion 73 of the shaft 68 extends through what may be referred to as a slot 75 in the retainer 62. It will therefore be apparent that as the shaft is rotated the retainer 62 will also be rotated and yet will be permitted to move axially with respect to the shaft because of the relationship of the flattened portion 73 residing in slot 75. It will also be observed from viewing the structure disclosed in the drawings that the effective area at the second end portion 34 of the poppet 32 which is exposed to fluid pressure in the fluid inlet 28 is slightly greater than the first end portion 33 which is exposed to fluid pressure in the control chamber 37 when the manually operable by pass valve 44 is in an open position.

The operation of the presently disclosed relief valve will be described in conjunction with the graphs shown in FIGURES 5 and 6. It will be assumed for the sake of discussion that the present relief valve is capable of handling set pressures between 0 and 5000 p.s.i.g. The relief valve must of course be suitably connected in a system by plumbing attached to fitting 23 and body 25 and assuming that the pressures to be handled in the first instance are to be between 0 and 500 p.s.i.g. (or other ranges depending on the springs used), the manually operable by pass valve 44 is closed by moving the set screw 46 to the right as seen in FIGURE 1. It will therefore be apparent that the pressures in the fluid inlet 28 under these conditions must be regulated by the springs 58 and 64 alone and referring to the graph on the lower half of FIGURE 5, it will be seen that the springs maintain a relationship with respect to the fluid pressures in the inlet 28. In this embodiment the effective cross sectional area exposed to fluid pressure at the second end portion 34 will be assumed to be .4596 square inch. It will be apparent that the areas may be otherwise as desired. The position of the control knob 71 is preferably calibrated so that a given rotational position will indicate to an operator thereof a given compression of the springs which is of course related to the inlet pressure which the valve will handle. Downward movement of the retainer 62 of course causes compression of the springs with the resultant control of higher pressures as indicated on the graph and upward movement of the retainer causes the relief of pressures in the fluid inlet at correspondingly lower values.

If it is desired to handle pressures above 500 p.s.i.g. for this particular configuration, then it is necessary to open the manually operable by pass valve 44 by backing off or moving the set screw 46 to the left as seen in FIGURE 1. It will therefore be apparent that inlet pressure is communicated to the control chamber by way of passageways 40 and 48 and as a result there will be fluid pressure tending to open the poppet 32 and fluid pressure tending to close the same from the control chamber 37. The effective fluid force tending to open the poppet 32 will be the fluid pressure multiplied by the difference in the cross sectional area of the poppet 32 which is exposed to the fluid pressure in the inlet 28 and the cross sectional area of the poppet 32 which is exposed to the fluid pressure in the control chamber 37. For the sake of example in the present embodiment this difference in cross sectional area has been taken to be .045671 square inch. It will therefore be seen that with an inlet pressure of 501 p.s.i.g. the opening force of the valve will be approximately 22.8 pounds. Reference may be had to the graph at the top of FIGURE 5 and the graph of FIGURE 6 which shows the additional force required on the springs 58 and 64 in order to handle the corresponding relief of given set pressure between 500 and 5000 p.s.i.g. in the fluid inlet 28. It will be apparent to those skilled in the art that the pressures mentioned are only by way of example and different pressures can be handled by the use of different springs, areas and materials of construction.

It will thus be seen that the design of the present relief valve is able to handle quite accurately a range of relatively low pressures by means of a combination of differential fluid pressure and the spring forces. This is all accomplished by means of the manipulation of two external adjustments by an operator without the necessity of having to dismantle the relief valve from its associated piping. The use of the check valve 50 in the passageway 40 which as described above, is imperfect in nature in that it does not completely obstruct flow but simply cuts down the flow rate, helps in the closing action of the valve upon reduction of the fluid pressure in the inlet but with a slight difference between the pressure in the control chamber and at the fluid inlet. This check valve in effect helps narrow the range of reset pressures within which the main poppet 32 will reseat.

What is claimed is:

1. A relief valve comprising a housing, wall means defining a poppet seat in said housing, wall means defining a fluid inlet extending to said seat on the upstream side thereof and a fluid outlet extending from said seat on the downstream side thereof, a poppet movable between open and closed positions relative to said seat and having first and second end portions, a control chamber in said housing, said first end portion of said poppet communicating with said control chamber, wall means defining a passageway extending into said poppet from said upstream side of said seat and extending to the outer surface of said poppet, a control valve seat in said housing and communicating with said opening in said poppet, manually operable valve means movable between open and closed positions relative to said control valve seat and being exposed for manipulation of an operator from the exterior of said housing, a continuation passageway extending from said control valve seat to said control chamber, a check valve located in said passageway and slowing flow of fluid from said control chamber to said upstream side of said poppet seat, a first spring retainer engaging said first end portion of said poppet, a first spring engaging said first spring retainer at one end and engaging an adapter at its other end, a second spring retainer located in said control chamber opposite said first spring retainer, a second spring engaging said second spring retainer at one end and engaging said adapter at its other end, said second spring retainer having threads on the outer circumference thereof, said housing having internal threads mating with said threads on said second spring retainer, rotation of said second spring retainer causing movement of same in either of first and second directions, a rotatable shaft having an end portion extending into said control chamber and being operably connected to said second spring retainer and having another end portion extending outside said control chamber, a control knob secured to said another end portion of said rotatable shaft and depending on the direction of rotation increases and decreases the compression of said first and second springs which in turn determines the force holding said poppet in said closed position on said poppet seat, fluid pressure in said control chamber acting on the effective area of said first end portion of said poppet and this effective area being slightly less than the effective area of the poppet adjacent said poppet seat and acted on by fluid on said upstream side of said poppet seat.

2. A valve including in combination a housing having a fluid inlet and fluid outlet and a fluid control chamber, a valve seat between said fluid inlet and outlet, a poppet movable between open and closed positions relative to said valve seat, said poppet having a first portion communicating with said control chamber and having a second portion adapted to be exposed to fluid pressure in said fluid inlet, a spring member in said control chamber exerting a force on said first portion of said poppet to constantly bias said poppet to said closed position, means for varying the force exerted by said spring member on said poppet, passageway means extending from said fluid inlet to said control chamber, the effective area of said second portion of said poppet for fluid pressure to act on tending to open said poppet being greater than the effective area of said first portion of said poppet for fluid pressure in said control chamber to act on tending to close said poppet, said passageway means extending at least partially through said poppet and having means therein to restrict the flow of fluid in the direction of the control chamber to said fluid inlet, and valve means in said passageway means for permitting and prohibiting fluid flow therethrough.

3. A valve as claimed in claim 2, wherein said means in said passageway means to restrict the flow of fluid comprises a check valve defining a restricted opening in the closed position thereof.

4. A valve as claimed in claim 2, wherein said valve means in said passageway means may be manipulated from the exterior thereof by an operator.

5. A valve as claimed in claim 2, wherein said means in said passageway means to restrict the flow of fluid comprises a second valve seat, a valve member movable between open and closed positions relative to said second valve seat, and spring means urging said valve member to closed position.

6. A valve as claimed in claim 5, wherein said valve member permits fluid flow through said passageway means in response to fluid pressure at said fluid inlet.

References Cited

UNITED STATES PATENTS

| | | | |
|---|---|---|---|
| 1,308,165 | 7/1919 | Clark | 137—529 |
| 2,287,936 | 6/1942 | Hose | 137—535 X |
| 2,412,428 | 12/1946 | Rockwell et al. | 137—535 X |
| 2,518,387 | 8/1950 | Shaw | 137—529 X |
| 2,672,888 | 3/1954 | Shields | 137—513.5 X |
| 2,680,453 | 6/1954 | Prijatel | 251—282 X |
| 2,759,487 | 8/1956 | Lornitzo | 251—282 X |
| 2,853,098 | 9/1958 | Fritzsche | 137—524 X |
| 2,873,086 | 2/1959 | Bryant | 251—282 |
| 3,017,897 | 1/1962 | Seguenot | 137—529 |
| 3,086,551 | 4/1963 | Gordon | 137—514.5 |
| 3,292,732 | 12/1966 | Webb | 137—529 X |

WILLIAM F. O'DEA, Primary Examiner

RICHARD GERARD, Assistant Examiner

U.S. Cl. X.R.

137—524, 529, 540